March 23, 1948.    J. A. SCHULTE    2,438,301
MIXING AND SELF-UNLOADING FARM TRUCK
Filed March 16, 1945    5 Sheets-Sheet 1
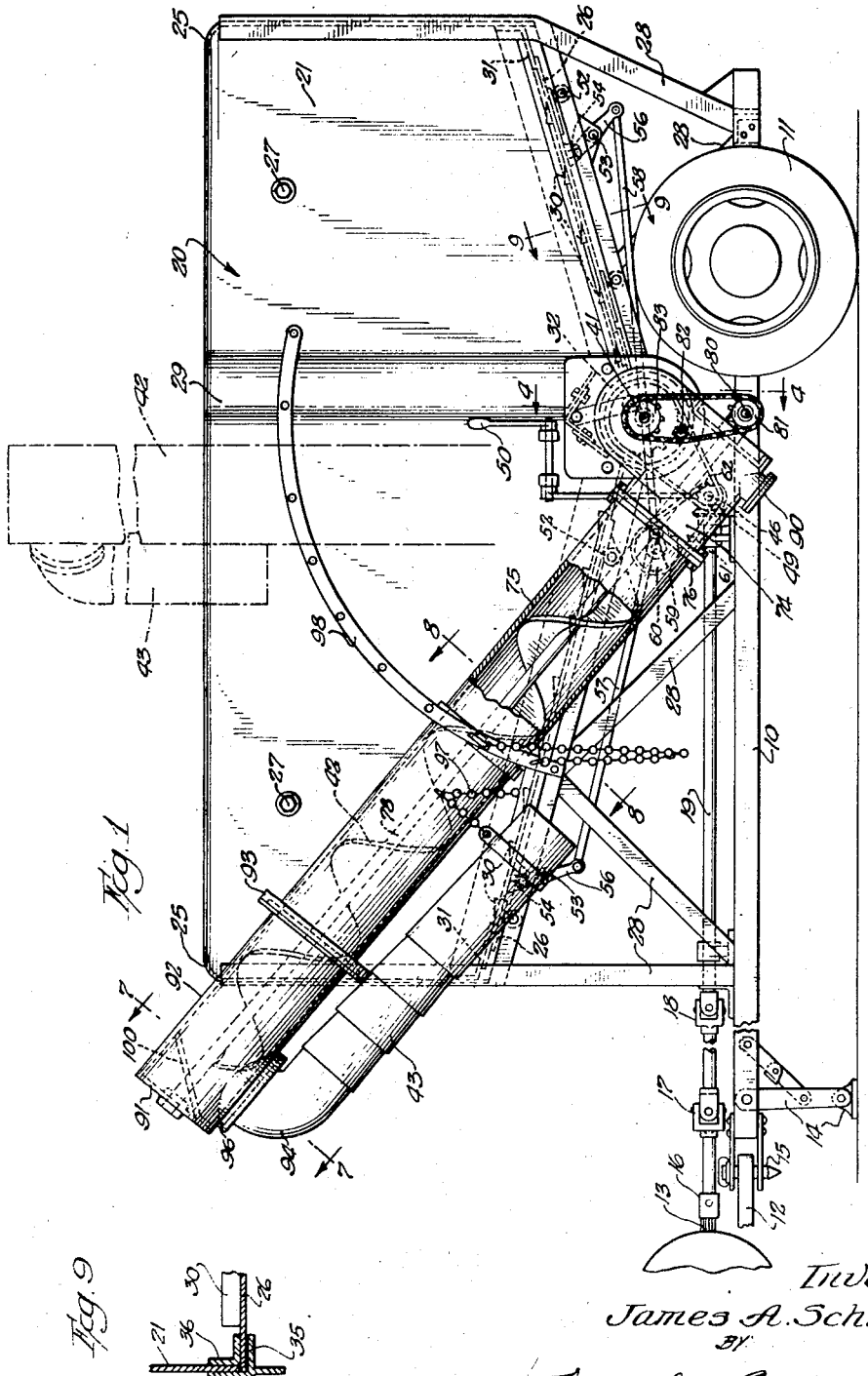
Inventor
James A. Schulte
By
Thiess, Olson & Mecklenburger
Attys.

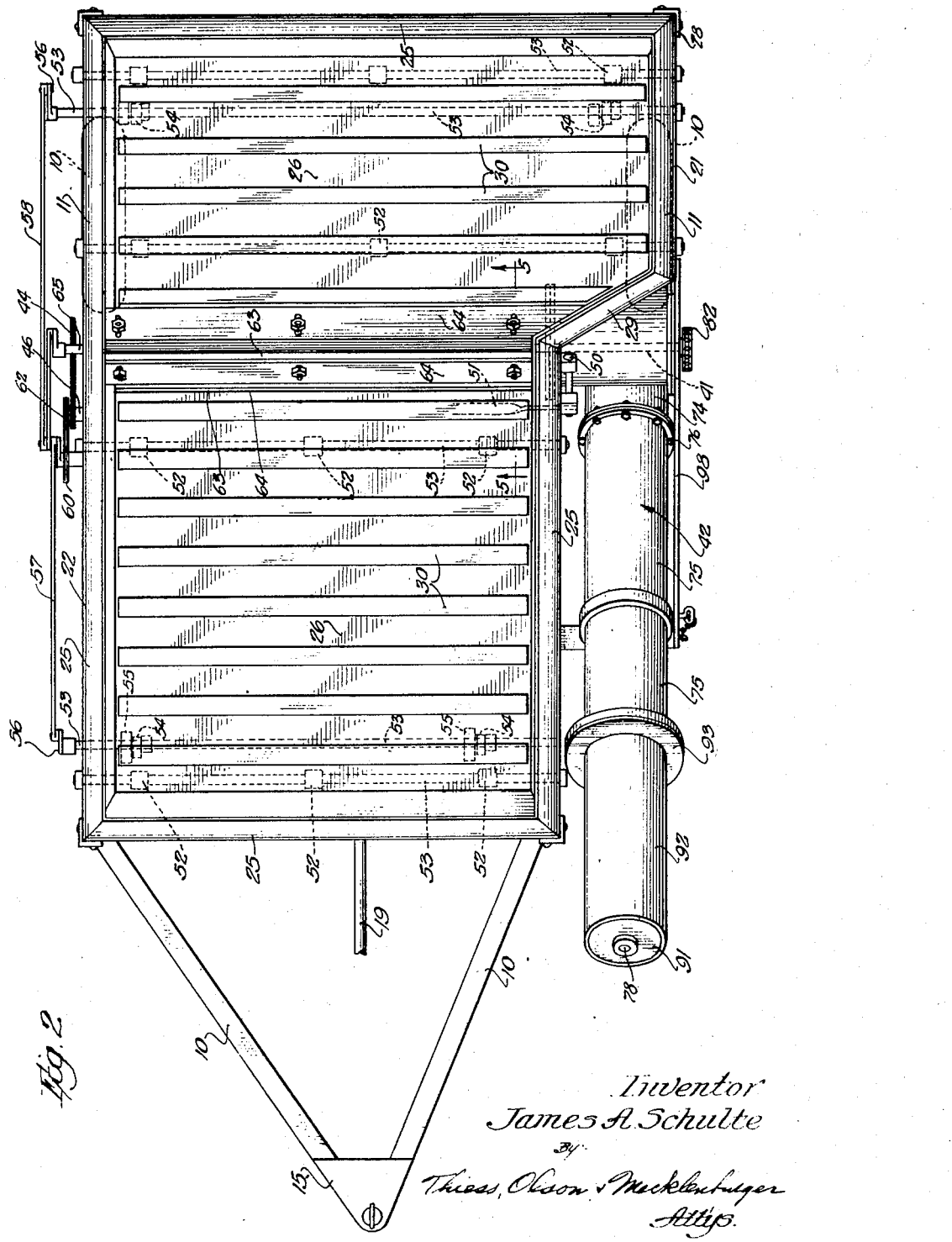

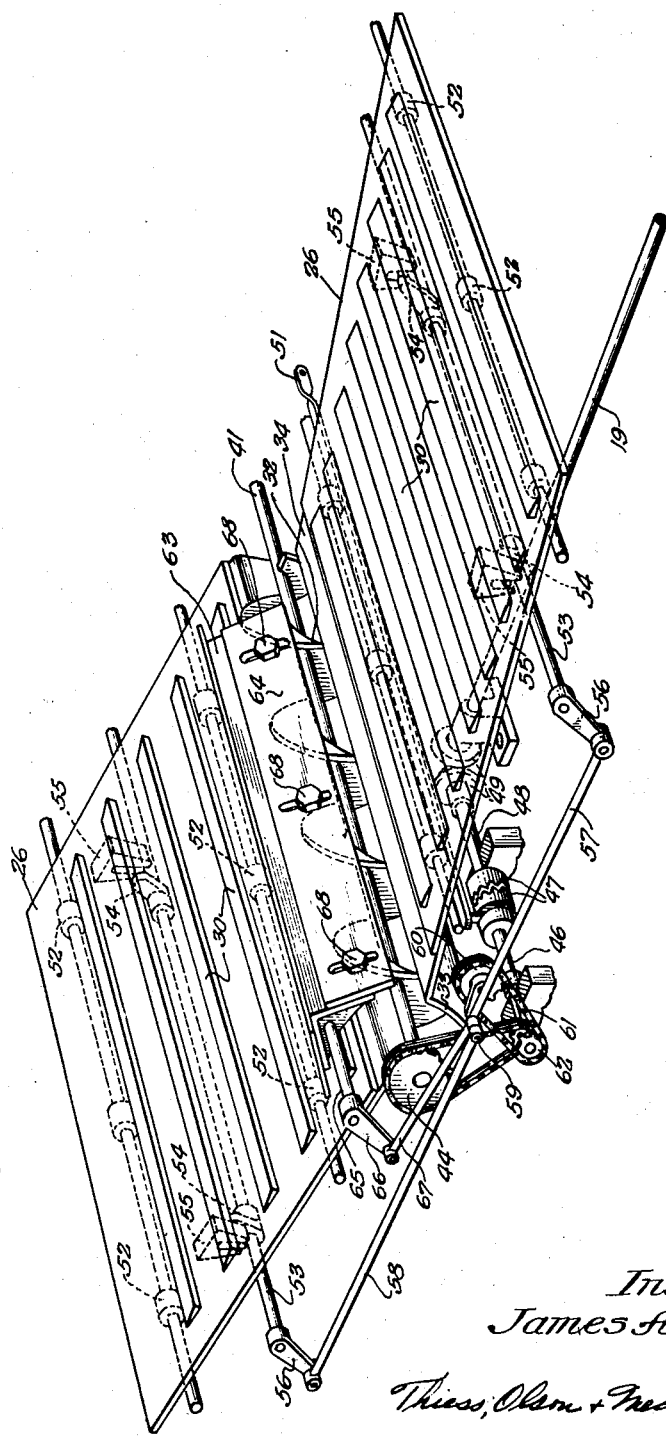

March 23, 1948.  J. A. SCHULTE  2,438,301
MIXING AND SELF-UNLOADING FARM TRUCK
Filed March 16, 1945  5 Sheets-Sheet 4
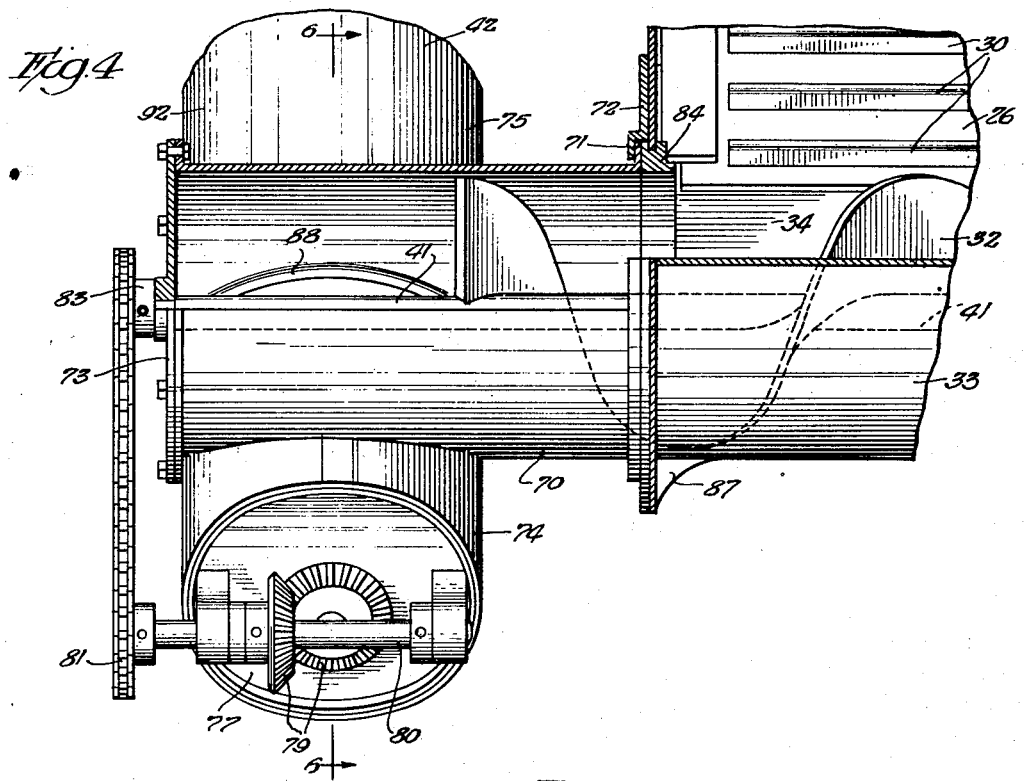
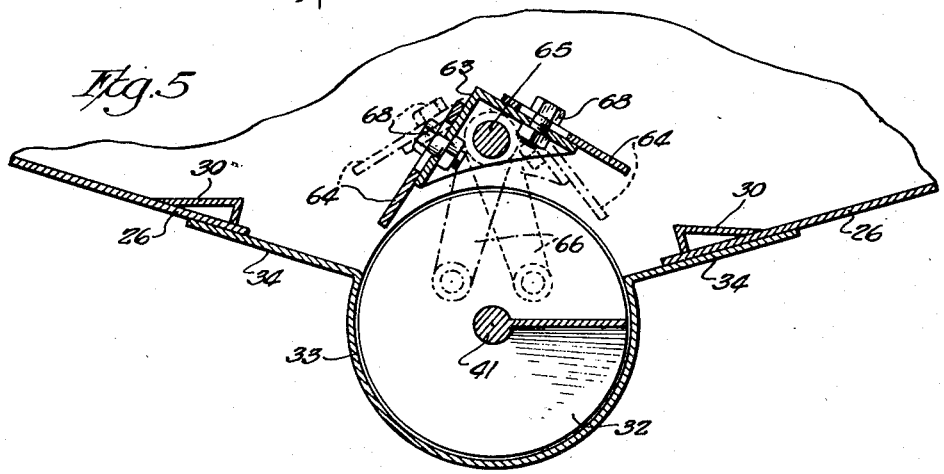
Inventor
James A. Schulte
By
Thiess, Olson + Mecklenburger
Attys.

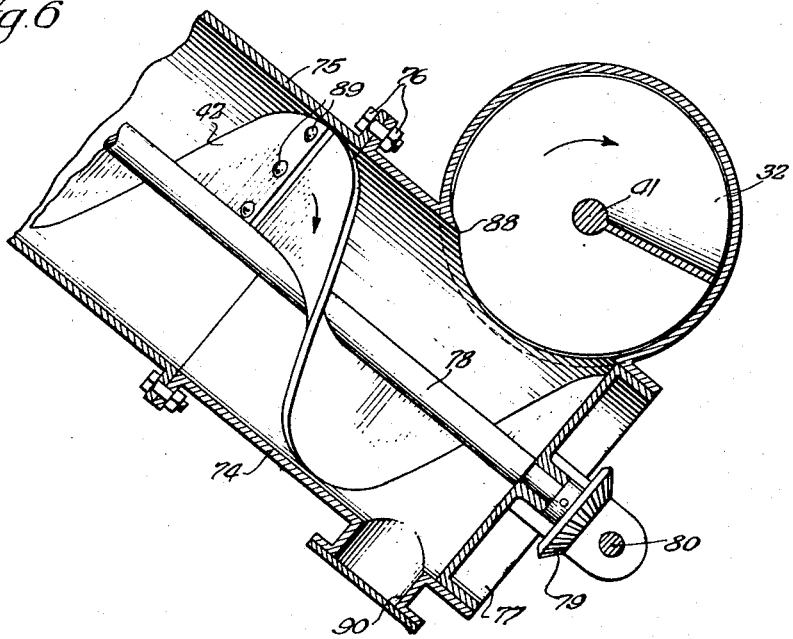
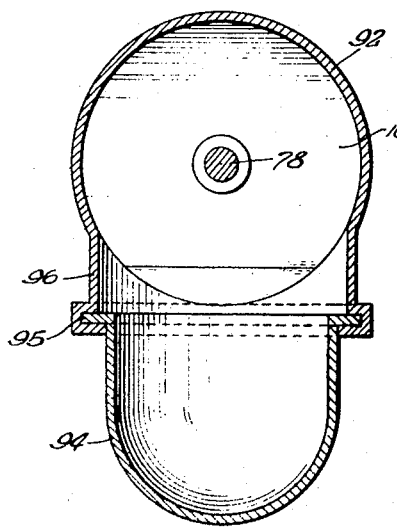
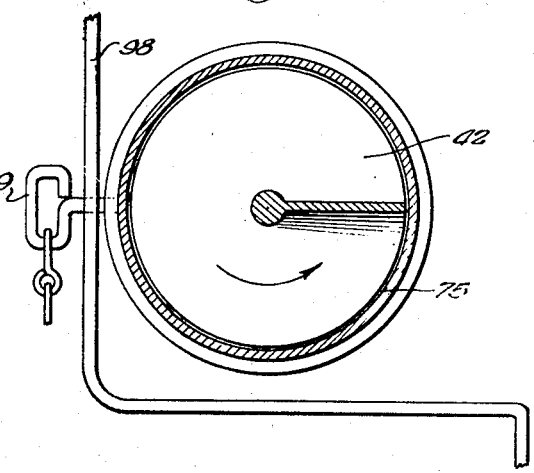

Patented Mar. 23, 1948

2,438,301

UNITED STATES PATENT OFFICE 2,438,301

MIXING AND SELF-UNLOADING FARM TRUCK

James A. Schulte, Sperry, Iowa

Application March 16, 1945, Serial No. 583,158

7 Claims. (Cl. 259—45)

This invention relates particularly to stock and animal feed mixing, blending and haulage trucks for farm use especially and where the feed may consist of a variety of ingredients, such as whole, chopped and/or ground grain, proteins or other prepared feed, silage and ground feed, or the like, and which should be properly and thoroughly mixed and blended into a composite homogeneous and efficient feed for the best consumption by the animals. Under modern farming practices of those engaged in stock feeding, such ingredients are usually kept or stored in and about the farm buildings, while the feeding grounds for the stock, including feeding devices, troughs, etc., may be located at more or less remote points in the fields or pastures and where they can be readily moved from one location to another to minimize animal diseases and for sanitary or other reasons. Under such conditions the farmer must take the feed from grinder or sheller, grain bin, silo or storage places and haul it out to the feeders in the fields and there try to scoop and mix it by hand in the open. This is a laborious and disagreeable task and, with the animals waiting and anxious to be fed and frequent inclement weather prevailing, is apt to be slighted and at best does not produce a properly mixed, blended homogeneous feed for the stock.

It is an object of this invention to provide a stock or animal feed mixing, blending and haulage truck which will overcome the objections mentioned and enable the necessary operations to be carried out expeditiously and efficiently without undue exertion or manual labor or exposure to the elements or interference thereby, and at the same time produce a thoroughly and freshly mixed, blended and wholesome feed for the animals.

In carrying out the invention there is provided a portable container, bin or tank of substantial capacity, preferably in the form of a trailer truck receiving power for the operation of its own mechanism from the towing tractor or truck or from its own independently carried source. This tank or bin, preferably in hopper form, is provided with means for recirculating the contents whereby the material deposited therein is progressively drawn from the bottom of the hopper and by a suitable conveying, elevating and spouting mechanism is redeposited in the top of the hopper. The material is thus recirculated throughout the tank and becomes thoroughly stirred, agitated and mixed so that it blends into a homogeneous feed product in proper condition for the stock. In use, the truck may be driven to the various bins or places where the ingredients are to be found or stored, to receive charges thereof in the tank or hopper of the desired amounts and in the order deemed best for their proper mixing. The agitation and recirculation of the contents of the hopper may be started as soon as desired, even before completely filling. When the hopper is filled to the desired extent, the truck is towed or driven to the feeding grounds wherever they may be located at the time, the recirculation taking place in transit if desired and being continued as long as deemed necessary. When the conditioning of the feed is completed, the product may be discharged or unloaded from the truck by continuing the operation of its mechanism and suitably adjusting the elevator and discharge spout forming part of the recirculating system, to direct the product into the feeder troughs for the animals or wherever desired.

The truck may be used also for the haulage of various farm crops, such as ear and shelled corn, small grains, soy beans, silage, etc., and, being self-unloading, saves much time and hard work such as scooping. The truck may, of course, be used for any purpose for which it is adapted. It may have its own source of power for operating its mechanism and even for driving the truck. As a mixer, particularly for places and seasons where the stock and feed are apt to be housed in the same building, or in other situations, the device may be stationary and not portable.

A further object of the invention, therefore, is the provision of a truck having a receptacle or receiving bin as a body with mechanism for mixing the contents thereof.

Another object is the provision of a truck having a receptacle or receiving bin as a body with mechanism for mixing the contents thereof and automatically discharging same.

A further object is the provision of a material-receiving bin or receptacle, and mechanism for withdrawing the material from the bottom of the receptacle and discharging it into the top thereof for recirculating and mixing purposes, or for discharging it to the outside to empty or unload the receptacle.

Another object is the provision of a truck having a hopper-like body, a conveyor mechanism midway of the bottom of the hopper to withdraw the material transversely to the side of the hopper, and an elevator and delivery spout to receive the said material from the conveyor mechanism and to deposit it through the spout wherever desired.

Another object is the provision of a truck having a hopper-like material-receiving body with end bottom portions sloping toward the transverse center, conveyor means at said center for transferring the material transversely to the outside of the body, an adjustable elevator at the side of the body to receive the material from said conveyor means, and an adjustable delivery spout at the discharge end of the said elevator.

Further objects and advantages will appear from this description and the claims to follow, in connection with the accompanying drawings, which illustrate, by way of example and not of limitation, a single embodiment of the invention, but it will be understood that various changes and alterations may be made without departing from the scope or principle of the invention as set forth in the appended claims.

In these drawings—

Fig. 1 is a side elevation of the truck;

Fig. 2 is a plan view thereof;

Fig. 3 is a perspective view of the vibrating bottoms of the truck and mechanism for operating same;

Fig. 4 is a view in larger scale detail view, partly in section, taken on the line 4—4 of Fig. 1 and showing the junction of the horizontal conveyor and the elevator;

Fig. 5 is a partial sectional view on the line 5—5 of Fig. 2 and showing the tilting gate or cover over the horizontal conveyor;

Fig. 6 is a detail sectional view on the line 6—6 of Fig. 4 and showing the construction at the bottom of the elevator and its junction with the horizontal conveyor;

Fig. 7 is a detail sectional view on the line 7—7 of Fig. 1 showing the construction at the upper end of the elevator and discharge spout;

Fig. 8 is a sectional view on the line 8—8 of Fig. 1, showing the guiding quadrant around the elevator and the securing pin for holding the elevator in any of its adjusted positions; and Fig. 9 is a detail section on the line 9—9 of Fig. 1.

Referring to these drawings, the truck, preferably in the form of a trailer, has a suitable frame or chassis 10 supported at the rear by pneumatic-tired wheels 11 and at the front is attached for towing to a tractor or suitable haulage truck, the drawbar 12 and power take-off 13 of which are indicated in Fig. 1. One or more temporary supporting feet 14 of usual construction are provided at the front end of the truck chassis and may be swung up out of the way when the trailer truck is attached to the tractor. The trailer truck may be attached to the tractor or hauling truck by the usual or desired pin and clevis arrangement 15 which is loose enough to permit movement in various angular directions, and the connection to the power take-off has the usual coupling 16 and the two universals 17 and 18, whereby the driven power shaft 19 of the mechanism of the trailer truck may be operable from the tractor, under the different road and haulage conditions apt to be encountered.

The two side members of the chassis 10 may be substantially parallel for the greater part of their length but are brought together at their front ends, Fig. 2, for attachment to the trailer or towing truck. They may be channel irons or of other cross-section and suitably secured together by rear end cross bracing members. The wheels 11 are connected to the chassis in any desired way and preferably through suitable springs.

The body of the truck is in the form of a material-receiving bin, hopper or container designated generally as 20, and comprising the vertical side members 21 and 22 and suitable end members with their upper edges curved inwardly to a slight extent, as at 25, to prevent the contents of the tank or bin from being jarred out, and the sloping bottom portions 26. These side and end members may be of sheet metal suitably riveted or otherwise secured to angle or channel iron or other supports and braces at the corners and elsewhere to make it sufficiently strong for the purpose and to be suitably carried on the chassis. Cross ties 27 of any suitable type may be placed across the bin near the top, as indicated in Fig. 1, and elsewhere to tie the sides together, and a framework of braces, struts, etc., 28 may be used to secure the tank or body to the chassis. The structure itself, for normal farm purposes, is of considerable weight and the load to be carried may be 5,000 lbs. or over or approximately 100 bushels of grain such as shelled corn.

As noted in the plan view of Fig. 2, the body is preferably of a width at the back to extend over the wheels 11 but the side 21 in the forward part is inset as at 29 to provide space for the elevator mechanism, to be described later, without increasing too much the over-all width of the truck and to afford protection to said mechanism located therealong.

The end portions 26 of the floor of the bin or receptacle forming the body are sloped inwardly and downwardly toward the center of the body where the transverse conveyor is located, as hereinafter described, and are preferably provided with means to agitate the material in the bin more or less and to urge and push the same down toward the conveyor. In the particular construction these end floor portions are made longitudinally reciprocal or vibrational for a short distance and are provided across the upper face with raised ribs 30 with abruptly sloping or square lower edges to engage the material in the body and push or urge the same downwardly toward the conveyor. This is accomplished by slidingly supporting the side edges of the floor portions on the inwardly extending flanges of the angle or T-irons 35, Fig. 9, secured along the lower edges of the sides 21 and 22 of the body, other strips or angles 36 being secured to the said sides inside thereof and having their inwardly extending flanges over the edges of the floor members 26 to confine them to that position in their vibration. At the ends these covering flanges 31, Fig. 1, are wider than those along the sides so as to cover the ends of the floor during vibration or reciprocation, and similar lower flanges on supporting angle iron strips may be provided. The means to be described for reciprocating, vibrating or shaking the floor members in timed relation with the tilting of the cover over the conveyor will be described later.

A transverse conveyor is located at the midsection of the body at the low point of the bottom. This is preferably in the form of a screw conveyor 32 having a surrounding trough-like casing 33, with outwardly extending edge flanges 34, Fig. 5, along the upper edges on which the lower edges of the floor sections 26 rest and slide in their reciprocating movement. The shaft 41 of the conveyor is suitably journaled in the body, and the conveyor serves to carry the material in the body over to one side and to deposit it in the lower end of an elevator which also is preferably a screw elevator 42 located outside the body in the space provided by the inset portion 29 before mentioned. This elevator is angularly adjustable and is provided with a flexible discharge spout 43 at its upper end.

The transverse conveyor is driven by a sprocket wheel 44, Fig. 3, on the opposite end of the conveyor shaft 41 from the elevator 42 and outside the body, which sprocket is connected by a sprocket chain to a sprocket wheel on short shaft 46 carrying one member of a suitable slip clutch 47, the other member of which is fixed on shaft 48 in alignment with shaft 46 and connected through bevel gears 49 with the longitudinal power shaft 19 which is driven by the power take-off 13 of the tractor as above described. The clutch may be conveniently thrown into and out of driving connection by the hand lever 50 (Fig. 1) connected by suitable linkage 51 with the sliding member of clutch 47. This clutch may be of the usual or desired construction to drive the mechanism normally but to slip in case of heavy starting torque or if the conveyor, elevator or other parts become clogged or jammed, and which may be manually controlled in a proper manner as by the lever 50.

As before stated, the sloping end floors 26 of the bin or tank are preferably mounted to shake, vibrate or reciprocate longitudinally to urge the material toward the conveyor. To lessen the friction at the edges of the floor and to assist in carrying the weight imposed thereon, suitable rollers 52, as many as desired, and long or short, beneath the floors and supporting the same, are mounted on rods or shafts which extend between the lower edges of the sides of the bin construction and may also act as tie rods therebetween.

To shift these floors back and forth any desired means may be provided, but, as shown, a shaft 53, Fig. 3, suitably carried by the framework is located under each floor section and lever arms 54 secured thereon engage by pin and slot connections, as indicated, with lugs 55 secured to the underside of the floors, so that the oscillation of the arms 54 results in vibrating the floor sections or sliding them back and forth.

These shafts 53 are each provided with a depending crank or lever arm 56, one of which is connected by a link or bar 57 and the other by a similar rod or link 58 with the crank pin 59 carried or operated by sprocket wheel 60 suitably mounted on the frame of the truck and driven by chain 61 from a sprocket wheel 62 on the clutch shaft 46, Fig. 3. With this arrangement, therefore, when the clutch 47 is engaged to operate the conveyor, the floors 26 are likewise set into operation, and are disconnected from the power when the clutch is opened.

It will be noted too that when one floor section 26 in one end of the body of the truck moves downwardly toward the conveyor 32 the section 26 in the other end moves upwardly or away from the conveyor. This brings them into timed relation with the tilting cover or gate 63, Figs. 3 and 5, over the conveyor. This gate comprises an angular hood with sloping adjustable sides 64 carried on a shaft 65 mounted in suitable bearings in the sides of the bin structure and having a lever arm 66 affixed thereto which is connected by a bar, rod or link 67 with the crank 59 on sprocket wheel 60. This connection causes the cover to tilt or oscillate back and forth to close or narrow the opening beneath its edge into the conveyor on one side and to widen the opening thereinto on the opposite side. The opening or raising of the cover or gate on one side of the conveyor occurs simultaneously with the approach of the floor thereto on that side. This tends to prevent the feeding of too much material to the conveyor and the clogging thereof. The weight or load of the material in the body over the conveyor is thus carried by the cover and the screw is relieved thereof. The sides 64 of the tilting cover may be adjusted by the bolt and slot adjustments 68 shown to vary the width of the openings to the conveyor according to the material being handled by the truck or the rate of discharge desired. The pointed upper end or ridge of the vibrating gate tends to agitate the material above and assists in the feeding or discharge thereof.

The sprockets, chains, links and connected lever arms, as shown in Fig. 1, are outside the adjacent vertical wall of the body but do not project unduly and, if desired, may all be covered by a suitable shield, not shown. In fact, all the exposed operating parts may be shielded in use, as for instance the power take-off 13, coupler 16, universals 17 and 18 and shaft 19, all in accordance with standard practice.

Referring now to the opposite side of the truck, a casting, Figs. 4 and 6, may form the end of the conveyor 32 and the lower end of the elevator 42. These are at right angles to each other and intersect partially. The horizontal portion 70 has at the inner end an out-turned flange 71 which swivels in a ring plate 72 bolted to the side wall 21 and framework of the body. The outer end of this portion 70 is closed by a removable disc 73 suitably bolted thereto and providing a bearing for the end of the conveyor shaft 41. The portion 74 at right angles axially to the portion 70 forms the lower part of the casing or tube of the elevator 42 to which the upper part 75 of the said tubular casing may be bolted as at 76. The end of said elevator portion 74 may be closed by the end plate 77, bolted or otherwise secured thereto and which carries the lower bearing for the shaft 78 of the elevator screw 42. On the projecting lower end of this elevator screw shaft 78 and outside the end plate 77 is one of the bevel gears 79, the other meshing gear being mounted on shaft 80 carried in suitable bearings on said end plate 77. On the end of this cross shaft 80 is a sprocket wheel 81 connected by chain running over a suitable, adjustable slack take-up device 82 with sprocket 83 located on the end of conveyor shaft 41. By this means the elevator is driven by and with the conveyor and, preferably, at slightly greater speed as shown by the relative sizes of the sprockets whereby to tend to carry the material up the elevator at a little greater speed than it comes from the conveyor and thus avoid clogging at the lower end. This arrangement also permits the elevator to be swung to any position within its limits of angular positioning without affecting the driving gear thereof. It merely pivots about the swivel 71—72 and keeps on working. Since all the parts involved swing together, this operative relationship is not disturbed.

At this point it may be noted that a ring 84 or section of a ring, Fig. 4, having a circular knife edge is inserted in line with the casings 32 and 70 surrounding the conveyor screw and at the entrance of the latter, the said knife edge and ring covering the arc between flanges 34 of casing or trough 33, so that any projecting matter in the material being carried along and out by the screw, as for instance an ear of corn which did not work itself wholly down into the conveyor casing or trough 33 before reaching the end, is sheared off by the knife edge when the helical vane of the screw 32 presses it thereagainst. The helical vane of the screw at this end portion particularly is preferably made heavier and stronger for this purpose even though made of the usual lighter material throughout the remainder of its length, the two parts being joined by welding, riveting or in any desired manner. The knife ring 84 may be a split ring or other desired construction and secured in place by bolts or otherwise to the side plate 21 of the body, which may be extended downwardly at this point, or to the ring plate 72. A similar extension of side plate 22 or added ring plate, similar to plate 72, and a supporting connection of the conveyor and its casing therewith and affording a bearing for the conveyor shaft may be had at the other side of the body. Suitable bracing, as indicated at 87, Fig. 4, may be placed between the conveyor casing 33 and the said side plates or bin frame.

A similar knife edge 88, Fig. 6, may be formed around the upper side or arc of the intersection of portions 74 and 76 of the end casting or member, and for the same purpose, that is, to shear off any projecting material being pushed up the elevator by the screw 42. The screw helix is preferably made heavier and stronger at this lower end for such shearing purpose and to get the material started upwardly in the elevator. It may be made lighter above and suitably connected to the heavier portion as by rivets, indicated at 89, or otherwise. While the cutting edge 88 is shown integral with the casting it will be understood that it may be made separately and attached thereto in any desired manner.

A suitable hand hole 90 provides convenient access to the interior of the casting for inspection, cleaning or any desired purpose, and the end plates 73 and 77 likewise may be removed for similar reasons.

In use the material from the body is taken by the horizontal conveyor and discharged into the lower end of the elevator onto the helical screw 42. It is then carried upwardly in the elevator by the screw and discharged into the delivery spout 43. For this purpose the shaft 76 of the screw is suitably journaled in the end 91 of the elevator. An angularly placed deflecting plate 100 may be put in the end of the elevator casing to direct the elevated material into the discharge spout 43. The helical vane of the elevator runs substantially to the upper end. The upper end 92 of the elevator casing or pipe is swiveled at the joint 93 by any usual or desired construction to the part beneath to permit the discharge spout 43 to be turned axially about the elevator to any desired position.

This discharge spout 43 may consist of a plurality of sections, as indicated, of sheet-metal pipe more or less loosely connected at the joints to impart flexibility thereto and, if desired, to make the same extensible and contractible, the upper section 94 thereof being in elbow form and connected by a suitable swivel 95 with the part 96 which is attached to the end 92 of the elevator casing over an opening therein, as indicated in Figs. 1 and 7. These details of construction are well known and need not be further described.

The two swivels 93 and 95 enable the discharge pipe or spout 43 to be directed as desired. A hook and chain 97 keep the end of the spout in closed or folded position parallel to the elevator when the truck is not in use or when it is not desired to use the elevator or at any time, to prevent it from swinging loosely about.

As before stated, the elevator may be adjusted to any desired angular position within its limits, and to confine it thereto a quadrant or guide rail 98, Figs. 1 and 8, is provided, its inwardly bent ends being secured to the side plate 21 of the body, and a pin 99 secured by chain to the quadrant to prevent its loss or misplacing is adapted to be inserted through spaced holes in the quadrant and into a hole in a band encircling the elevator casing 75. By this means the elevator may be adjusted to any working position from the vertical to the angular position shown and secured therein by the pin. Any suitable means may, of course, be provided, the one shown being merely illustrative.

From the foregoing the operation will be apparent. The power received from the towing truck or tractor through the usual power take-off on such devices is transmitted through the power shaft 19 to the mechanism of the truck of this invention. It may be stated here, however, that if an independent source of power be desired for the mechanism of the truck, the same may be provided conveniently by a separate motor of any desired type, such as a gasoline- or oil-driven or other motor or engine located, for example, on the front of the chassis underneath the end of the hopper, bin or body, or partly so, and connected through suitable transmission with the power shaft 19. And, of course, the truck may have its own driving power, so as to be independent of tractor or haulage truck for towage, but that would be more extensive and expensive than the simple trailer truck here contemplated.

The application of the power from the driving shaft 19 to the mechanism of the truck is controlled by the operator through the hand lever 50, which operates the clutch 47. When this is thrown into engagement, the remainder of the mechanism is operated. Thus, the conveyor 32 is driven through the sprocket wheel 44 on its shaft, the sprocket chain and the sprocket on the power-driven shaft 46. The elevator in turn is driven by the sprocket on the other end of the conveyor shaft through the mechanism of chain, sprocket and bevel gears 79.

At the same time the floor sections 26 and the tilting cover 63 over the conveyor are vibrated in timed relation by means of sprocket and chain connection of the crank 59 with the power shaft 46, and the connecting rods 57, 58 and 67. This timed relation contemplates that when one floor section goes up the incline or outwardly toward the adjacent end of the bin or body, the other goes down or toward the conveyor screw, and further that the tilting cover over the conveyor opens or widens the feeding slot or opening to the conveyor screw on the side of the approaching floor section and closes or narrows the slot on the side of the receding bottom. The vibrating inclined steps or ridges 30 across the floor sections tend to feed the material in the bin toward the conveyor, this action being assisted by gravity owing to the inclination of the floor sections, and the tilting cover over the conveyor controls the feed thereto and prevents clogging. The adjustability of the sides of the tilting cover over the conveyor gives further control over the operation. The vibrating upper sharp edge of the tilting top tends to keep the material thereover in agitated condition for proper feeding to the conveyor.

By suitably adjusting the elevator and delivery spout the material from the bin may be delivered at any point desired. In the vertical position, preferably, as indicated in dotted lines in Fig. 1, the elevated material may be fed back into the hopper or bin for feed-mixing purposes especially.

As a feed mixer for stock the truck of this invention is particularly valuable, since it may be used conveniently to gather up the various ingredients of the feed at their respective sources and thoroughly to mix them without the hard manual labor and unsatisfactory method of so doing with a scoop or other shovel, commonly known as scooping, and transporting the same to the feeding grounds wherever located, and there self-unloading the mixed feed in the feeding troughs or wherever desired, again without the labor of scooping. It may also be used advantageously as a self-unloading truck for various farm crops, such as ear and shelled corn, small grains, soy beans, silage, etc., thus saving much hard work and time in scooping. Its various features make the device in whole or in part capable of advantageous use in different relations, as set forth at the beginning of this specification.

While but one embodiment of the invention has been shown and described in detail, it will be understood that various changes and alterations may be made therein without departing from the principle or scope thereof as set forth or intended to be set forth in the appended claims, as follows.

I claim:

1. A bin for receiving material, said bin comprising sloping converging bottoms, means for vibrating said bottoms toward and from the convergence thereof, sloping projections on and secured to the upper faces of the bottoms to agitate and push the material toward said convergence in the vibration of said bottoms, a conveyor at the convergence of said bottoms to receive and carry the material therefrom to the outside of the bin, and power means to simultaneously operate said bottoms and conveyor.

2. A bin having a material-receiving body with bottom portions sloping inwardly and downwardly from the ends, a transverse conveyor at the low point of said bottom portions, means for reciprocating said bottom portions toward and from the conveyor to urge the material toward the conveyor, a protective cover over the conveyor, means for shifting said cover to admit the material to the conveyor in timed relation with the forward push of the bottoms toward the conveyor, and power means simultaneously to operate said conveyor and shift said cover.

3. A bin with bottom portions sloping inwardly and downwardly from the ends, a conveyor at the low point of said bottom portions, means associated with the receptacle to urge the material toward the conveyor alternately on opposite sides, a tiltable protective hood over the conveyor, means for tilting the hood in timed relation with said means to open the passage to the conveyor for the advancing material on that side, and power means for simultaneously operating said material-urging and cover-tilting means and said conveyor.

4. A material-receiving bin, sloping bottom portions in said bin, a conveyor at the low point of said bottom portions, power means to reciprocate said bottom portions toward and from the conveyor alternately on opposite sides thereof, a tiltable cover over the conveyor, and power means to tilt the same back and forth in timed relation with the movement of the bottom portions to open the passage for the material to the conveyor on the side of the approaching bottom portion, whereby the material is fed to the conveyor and clogging prevented.

5. A material-receiving bin, sloping bottom portions in said bin, substantially horizontal ribs mounted on and extending across the faces of said bottom portions, a conveyor at the low point of said bottom portions, said bottom portions being disposed on opposite sides of the conveyor, and power means to reciprocate said bottom portions toward and from the conveyor and simultaneously to operate the conveyor, the ribs tending to move the material toward the conveyor in the reciprocation of said bottom portions and the conveyor to receive the material and carry it outside the bin.

6. A bin having a material-receiving body with bottom portions sloping inwardly and downwardly from opposite sides, a conveyor at the low point of said bottom portions to receive the material therefrom, means for reciprocating said bottom portions toward and from the conveyor alternately on opposite sides of the conveyor, a rocking cover having an inverted V-shaped cross-section over the conveyor, means for rocking said cover in timed relation with said bottom portions to open the passage to the conveyor on the side of the approaching bottom portion, the vibration of the bottom portions and cover serving to agitate the material and keep it flowing, and power means simultaneously operating for said bottom portions and cover and the conveyor.

7. A self-unloading farm truck for hauling material including or containing corn on the cob or portions of same, comprising a material-receiving body, a helical conveyor at the bottom of the body to transfer the material therefrom, a helical elevator on the truck to receive the material from said conveyor, said conveyor and elevator each having a worm and a surrounding casing, a knife-edged member in the casing about the exit of said conveyor from the body to shear off any protruding corn ears or parts thereof which may be pressed against it by the worm, whereby said sheared-off portion falls into the conveyor and discharges with the other material therein, a knife-edged member at the entrance to the elevator casing to shear off any protruding ears or parts thereof when pressed against it by the elevating worm, whereby said sheared-off ears or parts fall back into the other material being elevated and travel along therewith, an adjustable delivery spout at the discharge end of the elevator, and power means to operate said conveyor and elevator worms.

JAMES A. SCHULTE.

REFERENCES CITED

The following references are of record in the file of this patent:

UNITED STATES PATENTS

| Number | Name | Date |
|--------|------|------|
| 33,276 | Wright | Sept. 10, 1861 |
| 369,747 | Smith | Sept. 13, 1887 |
| 617,385 | Wright | Jan. 10, 1899 |
| 735,858 | Claudon | Aug. 11, 1903 |
| 742,162 | Casey | Oct. 27, 1903 |
| 796,477 | Wallace | Aug. 8, 1905 |
| 837,170 | Wishon | Nov. 27, 1906 |
| 1,163,057 | Adams | Dec. 7, 1915 |
| 1,615,334 | McGregor | Jan. 25, 1927 |
| 1,690,794 | Reschke | Nov. 6, 1928 |

(Other references on following page)

UNITED STATES PATENTS

| Number | Name | Date |
|---|---|---|
| 1,889,562 | Moulthrop | Nov. 29, 1932 |
| 1,933,346 | Schwentker | Oct. 31, 1933 |
| 1,997,301 | Kniffen et al. | Apr. 9, 1935 |
| 2,004,936 | Dorn et al. | June 18, 1935 |
| 2,056,239 | Walter | Oct. 6, 1936 |
| 2,139,417 | Milan | Dec. 6, 1938 |
| 2,271,170 | Danker | Jan. 27, 1942 |
| 2,276,903 | Welty | Mar. 17, 1942 |
| 2,296,014 | Benzel et al. | Sept. 15, 1942 |
| 2,325,731 | Arentzen et al. | Aug. 3, 1943 |

FOREIGN PATENTS

| Number | Country | Date |
|---|---|---|
| 14,769 | Great Britain | Sept. 18, 1890 |